United States Patent [19]

VanBuskirk

[11] 3,976,882
[45] Aug. 24, 1976

[54] INVISIBLE RADIATION IMAGING DEVICE

[75] Inventor: Lyman F. VanBuskirk, Ridgecrest, Calif.

[73] Assignee: The United States of America as represented by the Secretary of the Navy, Washington, D.C.

[22] Filed: June 23, 1975

[21] Appl. No.: 589,094

[52] U.S. Cl. ............................. 250/334; 250/372
[51] Int. Cl.² ........................................ H01J 31/49
[58] Field of Search.................... 250/330, 334, 372

[56] References Cited
UNITED STATES PATENTS

| | | | |
|---|---|---|---|
| 2,946,255 | 7/1960 | Bolay | 250/330 |
| 3,652,856 | 3/1972 | Paul | 250/330 |

*Primary Examiner*—Davis L. Willis
*Attorney, Agent, or Firm*—R. S. Sciascia; Roy Miller; Robert W. Adams

[57] ABSTRACT

A device for visually imaging invisible radiation, having a detector and light emitting diode circuit interposed between two identical coded rotating discs, wherein the LED provides an output in response to the invisible radiation passed by the first disc and detected by the detector. That portion of LED output passed by the second disc is the output of the system, which output will visually appear as a gray field with a bright spot corresponding in position to the position of the radiation source in the field of view of the system. The appearance of the output results from the patterns of the disc which permits 50% transmissivity at any moment in time when an infrared source is present. The visual appearance resulting from at least one complete rotation of the disc is a field of 25% illumination with bright spots of 50% illumination therein corresponding to bright spots in the field of view.

5 Claims, 4 Drawing Figures

U.S. Patent  Aug. 24, 1976  3,976,882
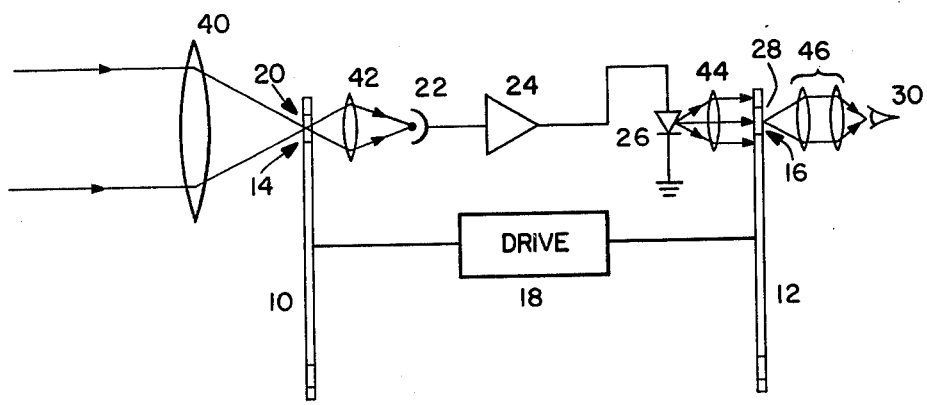
FIG. 1
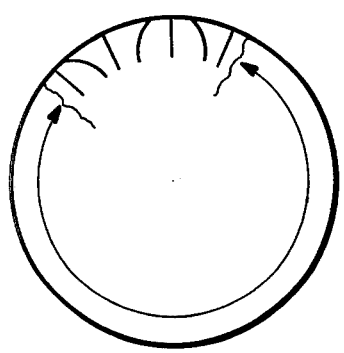   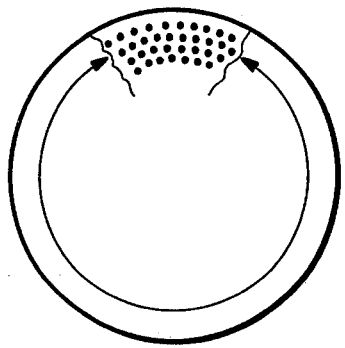   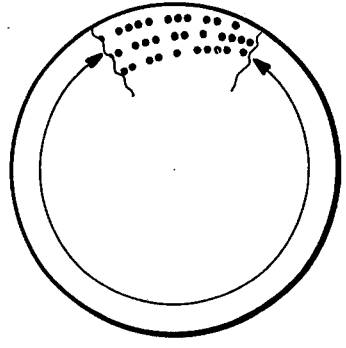
FIG. 2            FIG. 3            FIG. 4

INVISIBLE RADIATION IMAGING DEVICE

BACKGROUND OF THE INVENTION

The present invention relates to the field of processors having means for detecting the presence of an invisible source and its position in the field of view of the system. The present invention is a system for visually imaging the invisible.

Infrared and ultraviolet are invisible to the naked eye. In many applications it is advantageous if not imperative to detect and locate the source of infrared or ultraviolet radiation. Some employments of such devices are numerous military applications wherein, such as, the heat of an enemy gun or rifle barrel need be detected and its position located before countermeasures can be efficiently injected. Domestic applications include identification of hot spots in a burned out forest so that measures can be taken to prevent rekindling of the fire, among many others. Heretofor, most infrared-to-visual conversions were accomplished electronically wherein the image presented to an observer was electronically generated; and nearly all such prior devices are heavy, bulky, complex and sensitive to shock, which reduces their portability and increases their cost.

One prior device of which the present invention is an improvement thereover employs matched reticles with pseudo-random patterns, that are spatially oriented and synchronously driven. A photodetector behind the first sensor radiation within the field of view and provides an output which is then amplified. The amplified output drives a glow modulator that illuminates the second reticle with visible light having an intensity proportional to the magnitude of the amplified electrical output inputted thereto. The pattern of the light transmitted by the second reticle corresponds to the reticle's pattern that is illuminated at the moment. The total of the transmissions per rotation consists of a set of illumination patterns of various intensities. Like the present invention, their sum identifies the position of the source in the field of view of the system with a visible bright spot within an illuminated field.

The present invention simplifies the prior art by employing an on-off illumination source which, when coupled with the rotating, patterned reticle, will provide a set of illuminated patterns of equal intensity. That is, the illuminated portions are not weighted by intensity, and therefor, need not be processed as such. The result is a gray field of 25% maximum illumination having bright spot(s) of 50% maximum illumination corresponding to the source(s) of infrared radiation within the field of the system.

BRIEF DESCRIPTION OF THE DRAWING

FIG. 1 is a plan side view of the preferred embodiment of the present invention;

FIG. 2 is a frontal plan view of an exemplary discrete pattern on the rotating discs of the preferred embodiment of the present invention;

FIG. 3 is a frontal plan view of an exemplary random pattern on the rotating discs of the preferred embodiment of the preferred invention; and;

FIG. 4 is a frontal plan view of an exemplary pseudo-random pattern on the rotating discs of the preferred embodiment of the present invention.

DESCRIPTION OF THE PREFERRED EMBODIMENT

The preferred embodiment of the present invention is shown in FIG. 1 and includes first and second discs 10 and 12 having spatially oriented, identical patterns 14 and 16, respectively, of opaque and transmissive segments. Discs 10 and 12 are rotatably driven in synchronism by drive 18. It is important to the operation of the present invention that the patterns of the two discs be identical and they be driven in exact synchronism. Invisible radiation, such as infrared, that is transmitted through the transmissive segments of pattern 14 at window 20 will be detected by, such as, infrared detector 22, which detector provides an electrical output in response to each detection. The output is amplified in amplifier 24 and coupled to light emitting (LED) diode 26. The visible light emitted by LED 26 will be transmitted by the transmissive segments of pattern 16 on disc 12 at aperture 28 to utilization device 30. The pattern of disc 12 appearing in aperture 28 will be identical to the pattern appearing in window 20 at any moment in time. Therefore, infrared illumination of window 20 is identically duplicated by visible illumination of aperture 28. On the average, patterns 14 and 16 in window 20 and aperture 28, respectively, are one-half transparent and one-half opaque, by area. Therefore, at any moment in time when an emission source is in the field of view, one-half of the light from LED 26 will be transmitted to device 30. Over a complete rotation of discs 10 and 12 the scene observed by device 30 will be a field that is illuminated to 25% of the maximum illumination of LED 26 with a spot or spots of 50% maximum illumination corresponding in position to the position of the infrared source or sources in the system's field of view.

Also shown in FIG. 1 is focusing means 40 for focusing the light in the field of view onto window 20, and ocular 42 for converging the infrared radiation onto detector 22. The output of LED 26 is focused onto aperture 28 by optical means 44, and focused for utilization device 30 by eyepiece 46. Other optical devices known within the field may be substituted for the lenses shown without departing from the present invention.

FIGS. 2–4 show exemplary embodiments of patterns 14 and 16 that may be employed on discs 10 and 12 in the preferred embodiment of the present invention. The patterns, of course, cover the entire circumference of the disc but are shown by small segments only to facilitate illustration. FIG. 2 shows an exemplary design of a discrete pattern, FIG. 3 shows an exemplary design of a random pattern, and FIG. 4 shows an exemplary design of pseudo-random pattern. The pattern employed is not critical as long as the discs are matched and spatially oriented. It is recommended for optimum results that the pattern appearing in window 20 and apperature 28 at any moment in time be 50% transparent to the radiation of interest. By so designing, the output will be a field of 25% maximum illumination with 50% maximum illumination spot(s), as dissolved above.

The present invention operates as follows: identically patterned discs 10 and 12 are spatially oriented and rotatably driven by drive 18. When a source of invisible radiation appears in the field of view its emission is focused onto pattern 14 at window 20, and a portion thereof is transmitted to photodetector 22. The output of detector 22 is responsive to the transmitted radiation, and is amplifed by amplifier 24, the output of which is coupled to LED 26. LED 26 is switched on by a detection by detector 22, and it provides invariant illumination until detection ceases, at which time it is switched off. Each time LED 26 is switched on it is driven at a maximum illumination until it is switched off. As a result, the output of LED 26 can be considered to be a value 1 when on, and 0 when off. Pattern 16 at aperture 28 of disc 12 is 50% transparent and 50% opaque causing the field seen by device 30 (if the device could discern the single pattern in any moment in time) to be a series of illuminated spots corresponding to the pattern of 16 then appearing in aperture 28. A moment later the pattern will have changed, and the position of the spots in the field will have changed, accordingly. Over a complete rotation of disc 12 the scene will appear as an uniformly illuminated field of 25% illumination, and the spot or spots that correspond to the position or positions of the invisible source or sources within the field of view of the system will be 100% brighter than the background.

The reason that this occurs can be explained by the following anology; taking a number of identical opaque-transparent patterns of the type discussed above and placing the first in front of the observer's eye and recording the view, and then substituting additional patterns for the first, one at a time, each spatially disoriented from the previous ones, the composite of the observer's field of view will limit the scene to a single transparent spot corresponding to the source of illumination. The correlation technique is here employed by rotating the disc at a rate sufficient to generate a low level field with a bright spot therein denoting the presence and location of the source of illumination.

It should be noted that device 30 may also be a television camera, and that multicolor sensors and LED's to match may be employed to give multicolor images, wherein blue corresponds to visable light, green to light of 3–5 microns, and red to 8–14 microns, for example. The rate of rotation is not critical but, for optimum results, should be sufficient to provide a uniform field to the observer. The code pattern size determines both the resolution of the image and the bandwidth required in detector-amplifier-LED combination. The present invention would provide an expensive closed circuit television system and can be adapted for stereo television by multiplexing as with FM stereo. The transmitter-receiver would be located between the detector and the LED with a synch circuit to slave the second disc to synchronization.

When the disc pattern of FIG. 2 is used, crossed lines would be displayed, aiding in the localization if the IR target(s). The pattern in FIG. 4 needs to spiral in toward the center slightly to provide at lease one overlap to maximize resolution and avoid "dead" zones.

To those skilled in the art obvious upon a study of this disclosure that the present invention permits a variety of modifications in structure and arrangement and hence can be given embodiments other than those particularly described herein without departing from the essential features of the invention within scope of the claims annexed hereto.

What is claimed is:

1. An imaging apparatus for imaging invisible subjects into the visible, comprising:
    first and second structures having matched patterns of apertures;
    means for moving said structures in synchronism;
    detecting means between said structure for detecting invisible radiation transmitted by the aperture of said first structure as said apertures are moved in relationship to said detecting means by said moving means, and for providing an electrical output responsive to said detection; and
    a source of visible light normally not emitting and rendered emitting in response to said electrical output aligned with the apertures of said second structure;
    wherein visible light is transmitted by the apertures of said second structure as they move in relationship to said source of visible light in a corresponding relationship to transmission of said invisible radiation by the apertures of said first structure;
    such that the position of the source of said invisible radiation in the field of view of said apparatus appears as a bright spot in the field of view of an observer to the light transmitted by said second structure.

2. The apparatus of claim 1 wherein the intensity of the light provided by said source of light is uniform throughout its emission period.

3. The apparatus of claim 2 wherein said detecting means includes an infrared detector for detecting infrared radiation.

4. The apparatus of claim 2 wherein said detecting means includes an ultraviolet detector for detecting ultraviolet radiation.

5. The apparatus of claim 2 wherein said first and second structures are discs having matched annular patterns.

* * * * *